United States Patent [19]

Terada et al.

[11] Patent Number: 5,664,734
[45] Date of Patent: Sep. 9, 1997

[54] CRUSHER APPARATUS

[75] Inventors: Hiroshi Terada; Takehiko Kawano, both of Nabari, Japan

[73] Assignee: Nippon Pneumatic Manufacturing Co., Ltd., Osaka, Japan

[21] Appl. No.: 605,983

[22] Filed: Feb. 23, 1996

[30]     Foreign Application Priority Data

Feb. 23, 1995 [JP] Japan ..................... 7-035341

[51] Int. Cl.⁶ ..................................... B02C 1/06
[52] U.S. Cl. ........................... 241/266; 241/101.73
[58] Field of Search ................. 241/101.73, 266, 241/264, 265, 267, 268, 269; 30/134

[56]              References Cited
          FOREIGN PATENT DOCUMENTS

| 0 613 982 | 9/1994 | European Pat. Off. . | |
|---|---|---|---|
| 2275628 | 9/1994 | United Kingdom | 241/101.73 |
| WO95/35418 | 12/1995 | WIPO . | |

*Primary Examiner*—Mark Rosenbaum
*Attorney, Agent, or Firm*—Wenderoth, Lind & Ponack

[57]              ABSTRACT

A crusher having a bracket pivotally mounted on a free end of an arm of a civil engineering machine, a frame having a pair of support plates and rotatably mounted on the bracket, a lock arm having a pair of arm plates and pivotally mounted between the pair of support plates, the lock arm carrying at one end thereof a crushing jaw, a movable arm mounted between the arm plates of the lock arm so as to be pivotable about a first axis that is nearer to the tip of the arm than a second axis about which the lock arm pivots, a trunnion type drive cylinder mounted between the arm plates for pivoting the movable arm toward and away from the crushing jaw, the drive cylinder having pivots arranged on the second axis and pivotally supporting the lock arm, and a fixing means for fixing the lock arm to the frame at both ends of the pivoting motion of the pivot shaft about the second axis. The ends are separated a predetermined angle from each other.

9 Claims, 8 Drawing Sheets

CRUSHER APPARATUS

BACKGROUND OF THE INVENTION

The present invention relates to a crusher for demolishing building walls, roadbeds, bridges and so on.

Figure 8A:
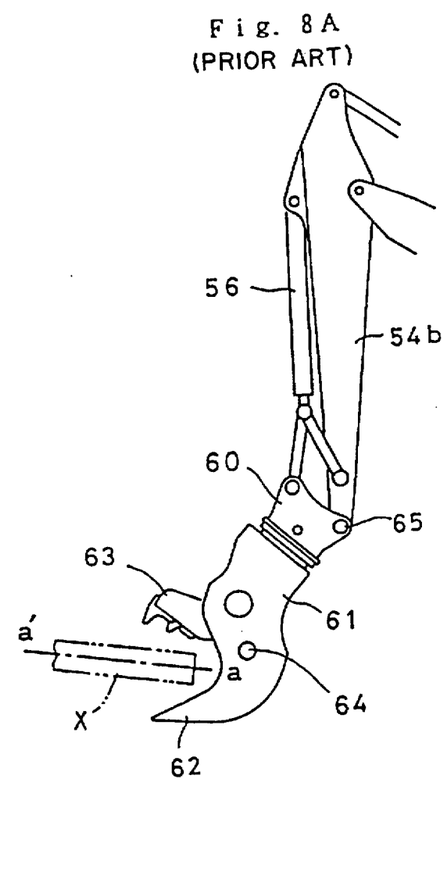
FIGS. 8A and 8B show the working angle of a conventional crusher.
Figure 8B:
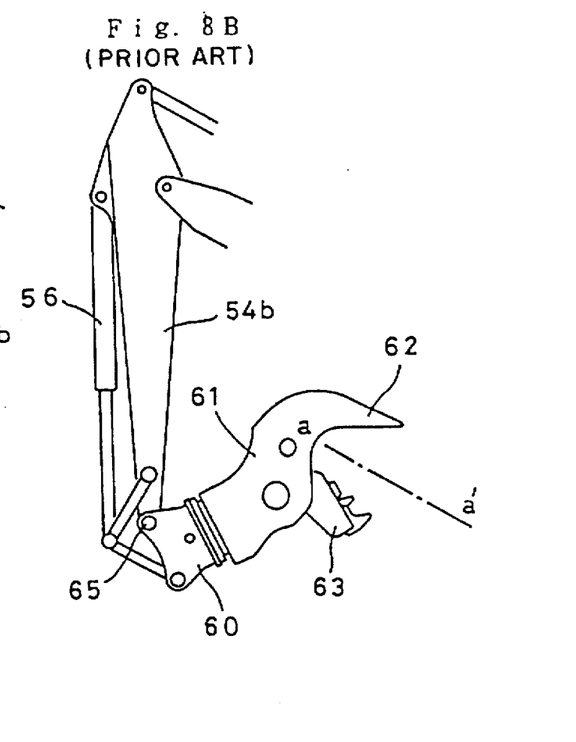

FIGS. 8A-B shows a conventional crusher mounted on the free end of an arm of a self-propelled civil engineering machine. This crusher comprises a bracket 60 pivotally mounted on the free end of the arm 54b of the civil engineering machine by means of a pin 65, a frame 61 rotatably mounted on the bracket 60 and having a crushing jaw 62, and a movable arm 63 having its rear end pivotally mounted on the frame 61 by mean of a pin. 64. An object X placed between the arm 63 and the crushing jaw 62 is crushed by pivoting the arm 63 with a driving cylinder (not shown). Otherwise the object X is crushed by swinging the bracket 60 with the object gripped.

This crusher has its crushing jaw 62 integrally formed on the end of the frame 61. Thus, provided the arm 54b is fixed, its angular working range within which the jaw 62 and the movable arm 63 can crush an object X is equal to the angle by which the bracket 60 can be swung about the pin 65 by a cylinder 56 mounted on the arm 54b i.e. from the position shown in FIG. 8A to the position shown in FIG. 8B. In FIGS. 8A and 8B, the line a–a' indicates the axis of an object X clutched by the crushing jaw 62 and the movable arm 63.

Figure 8C:
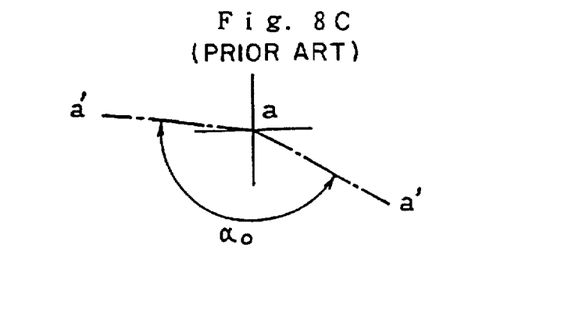
FIG. 8C diagrammatically shows the working angle of the conventional crusher.

FIG. 8C diagrammatically shows the above angular working ranger $\alpha_0$. In order to crush an object X that is disposed out of this range, the entire machine has to be moved and/or the arm 54b has to be swung. This arrangement drastically reduces the working efficiency. Particularly, when the work is difficult due to limited space, e.g. on a bridge.

An object of the present invention is to increase the working range within which the crushing jaw and the movable arm can crush an object.

Another object is to reduce the necessity of moving the civil engineering machine itself to a minimum and to increase the efficiency of the work.

SUMMARY OF THE INVENTION

According to the present invention, there is provided a crusher comprising a bracket pivotally mounted on a free end of an arm of a civil engineering machine, a frame having a pair of support plates on both sides thereof and rotatably mounted on the bracket, a lock arm having a pair of arm plates on both sides thereof and pivotally mounted between the pair of support plates of the frame, the lock arm carrying at one end thereof a crushing jaw, a movable arm mounted between the arm plates of the lock arm so as to be pivotable about a first axis that is nearer to the tip of the lock arm than a second axis about which the lock arm pivots, a trunnion type drive cylinder mounted between the arm plates of the lock arm for pivoting the movable arm toward and away from the crushing jaw, the drive cylinder having pivots arranged on the second axis and pivotally supporting the lock arm, and a fixing means for fixing the lock arm to the frame at both ends of the pivoting motion of the pivot shaft about the second axis, the ends being separated by a predetermined angle from each other.

The fixing means may comprise a pin hole formed in a rear end of the lock arm, and two pairs of engaging cylinders each having a rod, each pair of the engaging cylinders being mounted on the support plates of the frame opposite to each other so as to be disposed along the circular locus of the axis of the pin hole while being separated from the other pair by an angle equal to the predetermined angle, the rods of one of the two pairs of engaging cylinders being adapted to engage in the pin hole when the pin hole comes into alignment with the rods of each one pair of engaging cylinders.

Otherwise, it may comprise two pin holes formed in a rear end of the lock arm, the holes being disposed on a circumference having its center on the second axis and separated from each other by an angle equal to the predetermined angle, and a pair of engaging cylinders each having a rod and mounted on the support plates of the frame opposite to each other, the rods of the engaging cylinders being adapted to engage in one of the pin holes when the one of the holes comes into alignment with the rods.

With this arrangement, the angular working range of the crusher within which an object can be crushed by gripping it with the crushing jaw and the movable arm is equal to sum of the angle by which the bracket can pivot about a point at which the bracket is coupled to the arm and the angle by which the lock arm can pivot. Namely, the crusher of the present invention has an angular working range which is greater than that of conventional crushers by an angle equal to the angle by which the lock arm can pivot.

By using a single-acting or double-acting cylinder in the fixing means, the rods of the cylinders can be inserted into or pulled out of the pin holes formed in the rear end of the pivot to lock or unlock the lock arm by remote control. Once locked in position, the lock arm can be held in the locked position reliably.

Other features and objects of the present invention will become apparent from the following description made with reference to the accompanying drawings, in which:

DETAILED DESCRIPTION OF THE PREFERRED EMBODIMENT

We will now describe the embodiment of the present invention with reference to FIGS. 1–7.

Figure 1:
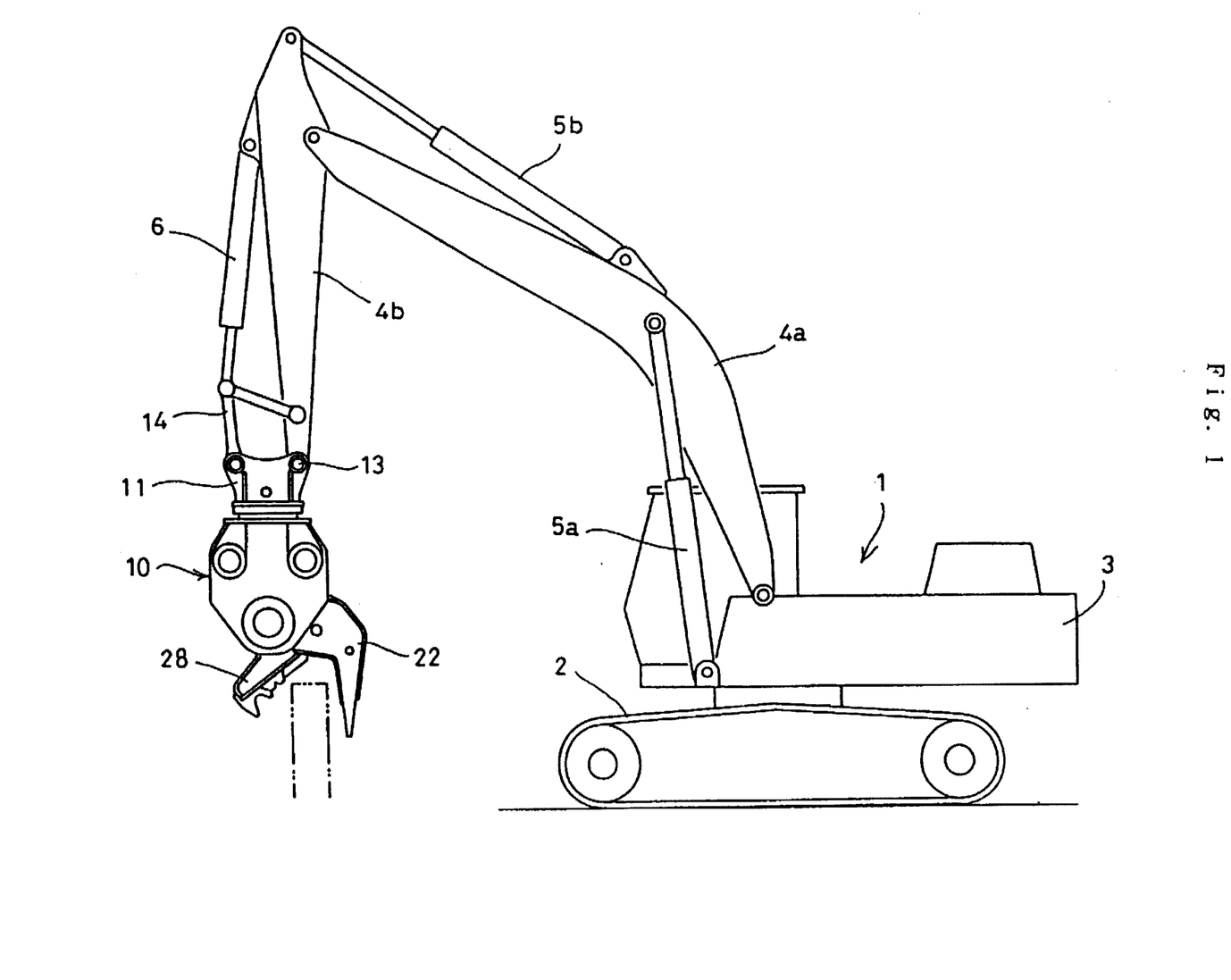
FIG. 1 view of a crusher according to the present invention, showing how it is used.

As shown FIG. 1, the self-propelled engineering machine 1 comprises a crawler 2, a swivel base 3 pivotally mounted on the crawler 2, a boom 4a pivotally mounted on the swivel base 3, and an arm 4b pivotally mounted on the free end of the boom 4a. The boom 4a is pivoted by a first cylinder 5a, while the arm 4b is pivoted by a second cylinder 5b.

Figure 2:
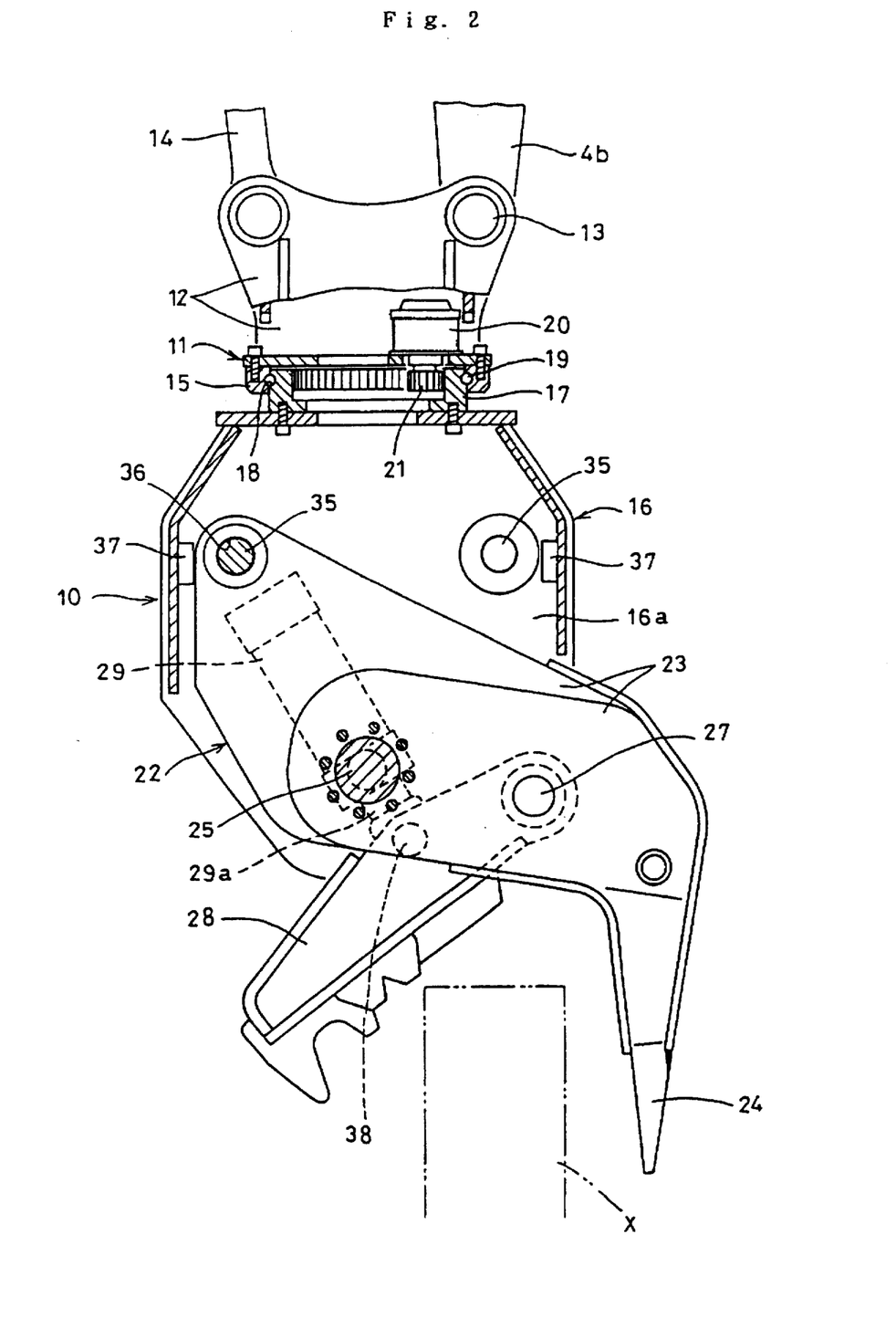
FIG. 2 is a sectional view of the crusher of FIG. 1.
Figure 3:
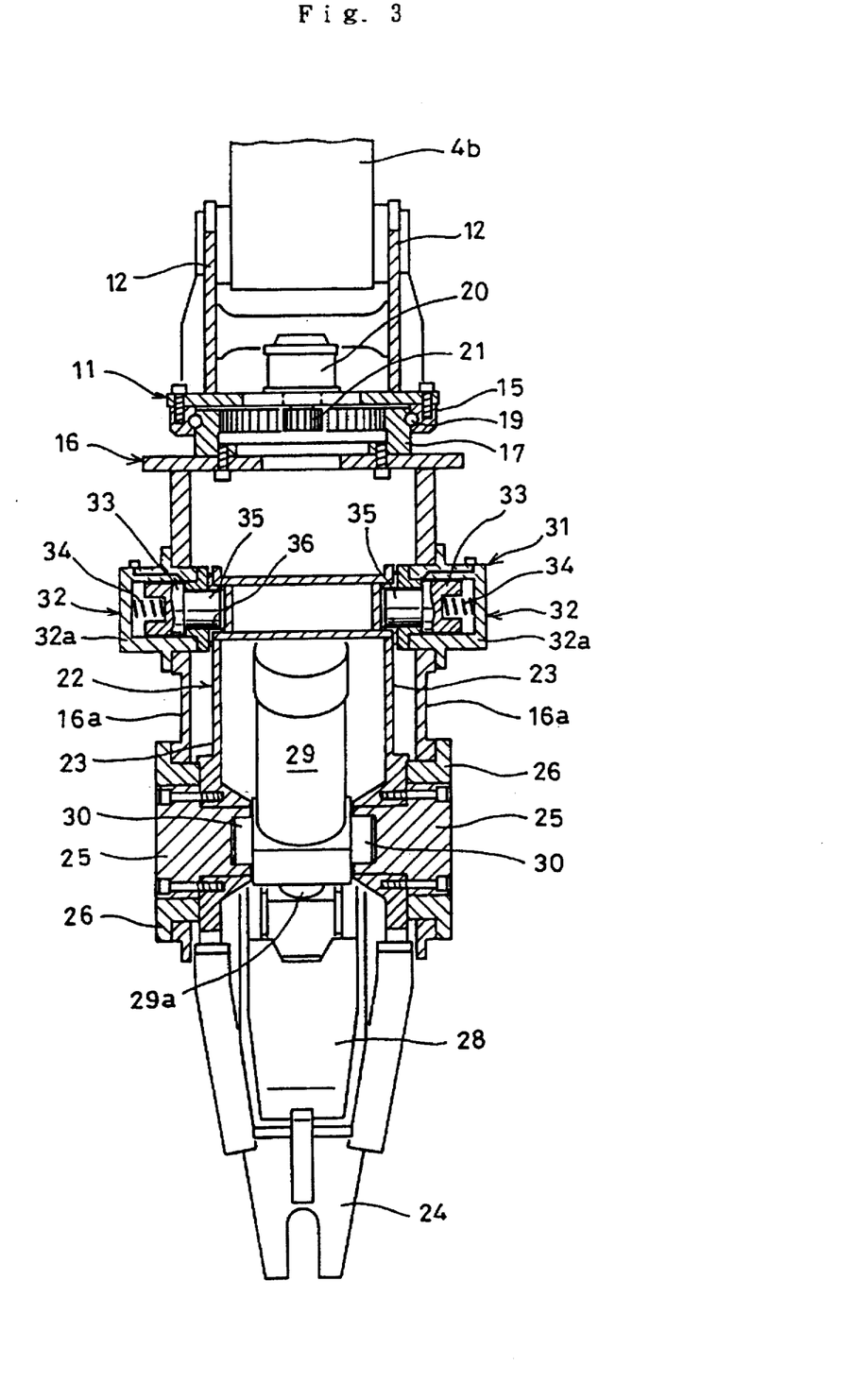
FIG. 3 is a vertical sectional side view of FIG. 2.

The crusher 10 of the present invention is mounted on the free end of the arm 4b. As shown in FIGS. 2 and 3, the crusher 10 has a bracket 11 with a pair of side plates 12 having one end thereof pivotally coupled to the free end of the arm 4b by means of pins 13.

As shown in FIG. 1, the side plates 12 are connected at their other ends to the free end of the arm 4b through a link 14 having an intermediate joint. A third cylinder 6 is connected to the intermediate joint of the link 14, so that the bracket 11 can be pivoted about the pin 13 by the third cylinder 6.

A bearing ring 15 is fixed to the underside of the bracket 11. A ring gear 17 fixed to the top of a frame 16 fits in the bearing ring 15. Balls 19 are received in ball grooves 18 formed in the outer periphery of the ring gear 17 and the inner periphery of the bearing ring 15. The frame 16 is thus supported so as to be pivotable relative to the bracket 11.

The bracket 11 carries a motor 20 having a rotary shaft with a pinion 21 that meshes with the ring gear 17. Thus, by driving the motor 20, the frame 16 rotates.

The frame 16 has a pair of support plates 16a on both sides. A lock arm 22 is mounted between the support plates 16a.

The lock arm 22 has a pair of arm plates 23 on both sides. It has one end protruding from the frame 16 and carries on this protruding end a crushing jaw 24.

Shafts 25 are bolted to the respective arm plates 23 of the lock arm 22. They extend through the arm plates 23. Their outer ends are rotatably supported by bearings 26 mounted on the support plates 16a as by bolts.

A pin 27 extends between the arm plates 23 of the lock arm 22 at a position nearer to the tip of the arm than the shafts 25.

A movable arm 28 has its rear end inserted between the arm plates 23 of the lock arm 22 and supported on the lock arm 22 through the pin 27 so as to be pivotable about the pin 27 toward and away from the crushing jaw 24. It is pivoted by a drive cylinder 29 mounted between the arm plates 23.

The drive cylinder 29 is a trunnion type cylinder having pivots 30 on both sides near its front end. The pivots 30 are arranged coaxially with the shafts 25 and are rotatably received in holes formed in the inner ends of the shafts 25. The drive cylinder 29 has a piston rod 29a having its leading end coupled through a pin 38 to the movable arm 28 at its intermediate point.

The lock arm 22 is pivotable about the shafts 25. A pair of stoppers 37 are provided on the inner side surfaces of the frame 16 to limit the angle by which the lock arm 22 can pivot. The lock arm 22 can be fixed in position in abutment with either of the stoppers 37 by a fixing means 31 (FIG. 3).

The fixing means 31 comprises a pin hole 36 formed in the rear end of the lock arm 22, and two pairs of engaging cylinders 32, each pair being mounted on the support plates 16a of the frame 16 opposite to each other so as to be disposed along the circular locus of the axis of the pin hole 36, separated from the other pair. The engaging cylinders 32 have rods 35 adapted to engage in the pin hole 36 when the pin hole come into alignment with the rods 35.

The engaging cylinders 32 are single-acting cylinders each comprising a cylinder tube 32a bolted so as to extend through the support plates 16a of the frame 16, and a piston 33 carrying the rod 35 and slidably mounted in the cylinder tube 32a. Front and rear chambers are defined in the cylinder tube 32a by the piston 33. The rod 35 is adapted to be pushed into the cylinder tube by the pressure of oil supplied into the front chamber and pushed out biased by a spring 34 mounted in the rear chamber.

Instead of mounting the spring 34 in the rear chamber, it may be filled with gas to urge the piston 33 out of the cylinder tube. Also, such single-acting cylinders may be replaced with double-acting cylinders in which the pressure oil is supplied selectively into the front and rear chambers to move the piston 33 back and forth.

Though not shown in the figures, various parts are fixed together by bolts or the like.

Now in operation, the movable arm 28 and the crushing jaw 24 are moved to both sides of an object X by pivoting the boom 4a and the arm 4b. Then, the drive cylinder 29 is activated to move the arm 28 toward the jaw 24 to crush the object X. Otherwise, the object X is broken by swinging the boom 4a or arm 4b while gripping the object X between the crushing jaw 24 and the movable arm 28.

Figure 4:
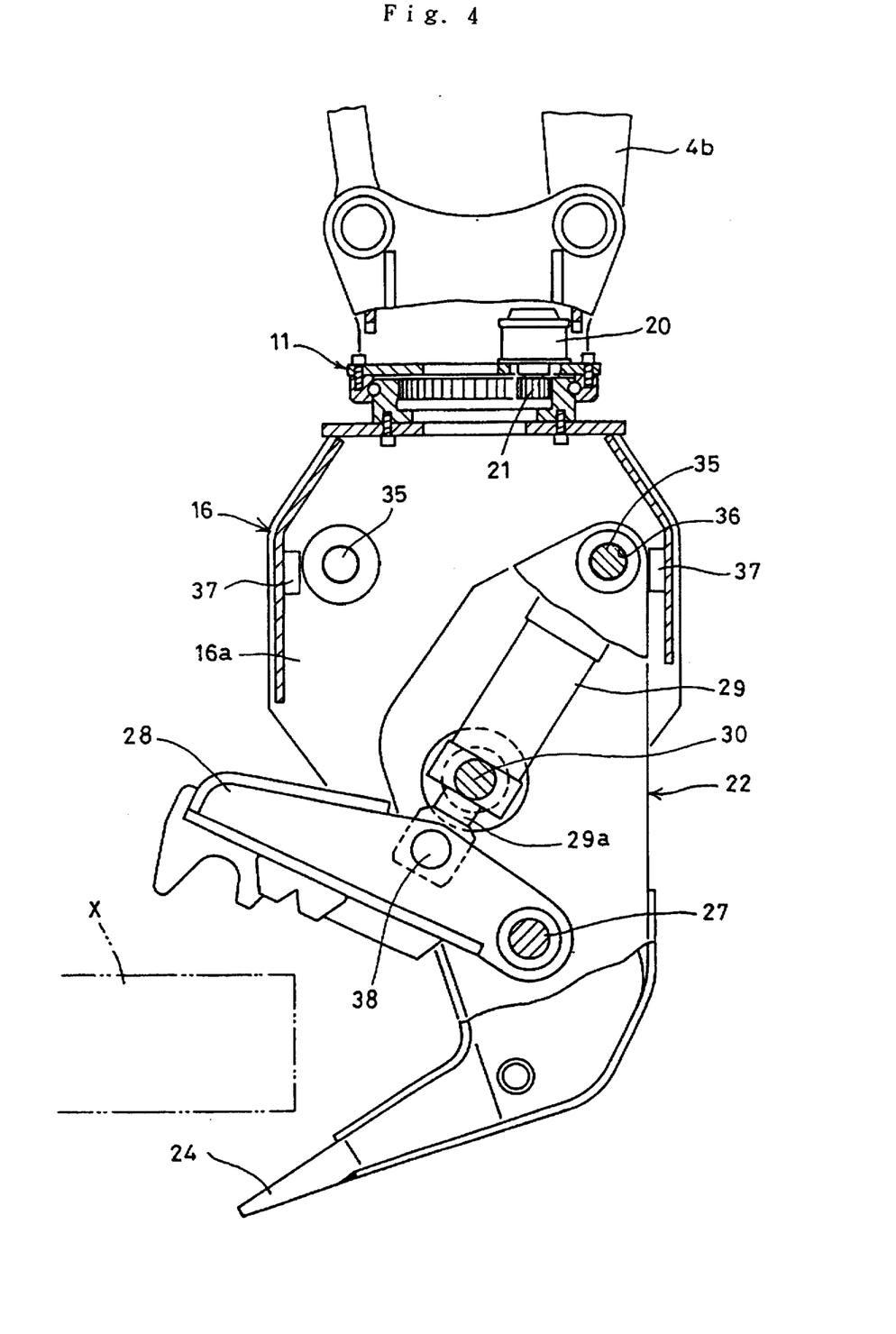
FIG. 4 is a sectional view of a lock arm in a different position from that of FIG 1.
Figure 5A:
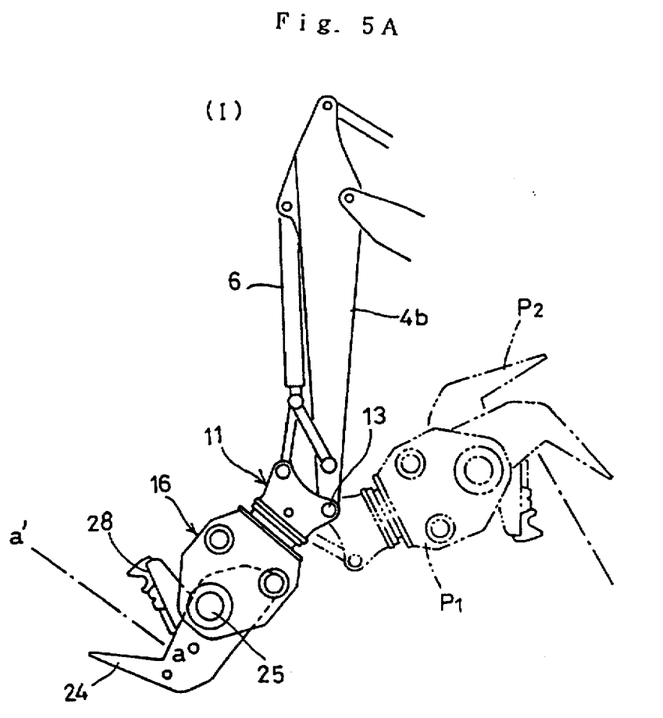
FIGS. 5A and 5B, show a working angle of the crusher when the arm is fixed.

FIG. 5A shows the state in which the third cylinder 6 supported on the arm 4b has been shrunk to the limit, with the lock arm 22 fixed in position by inserting the rods 35 of the pair of cylinders 32 on the righthand side of the frame 16 (in FIG. 4) in the pin hole 36 formed in the rear end of the lock arm 22. Line a–a' in FIG. 5A indicates the position of the object X clamped by the crushing jaw 24 and the movable arm 28.

By expanding the third cylinder 6 from the position shown in FIG. 5A, the bracket 11 is pivoted counterclockwise about the pin 13. It can be pivoted to to the maximum position shown by chain line P1 in FIG. 5A. Thus, the line a-a' pivots an angle $\alpha_0$ as shown in FIG. 5C. By pivoting the bracket 11 around the pin 13, the object X can be demolished. This angle $\alpha_0$ is exactly the same as the angle $\alpha_1$ by which the conventional crusher shown in FIG. 8 can pivot.

Figure 5B:
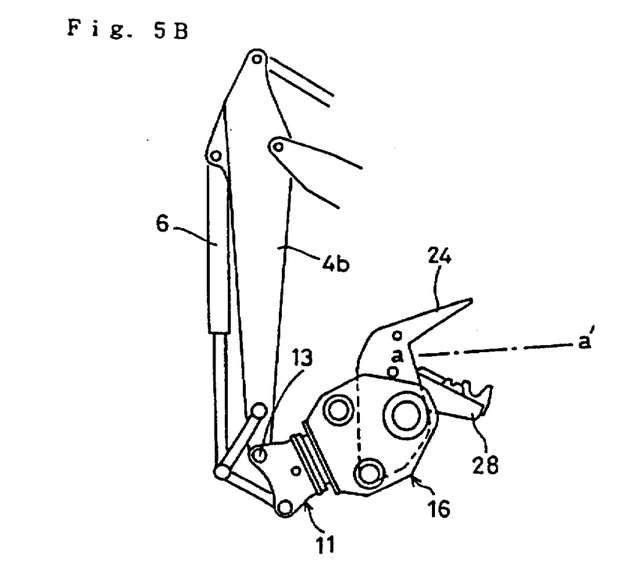
Figure 5C:
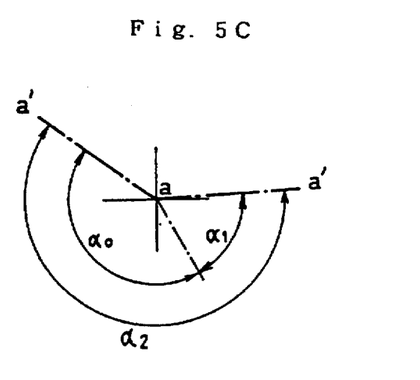
FIG. 5C diagrammatically shows the working angle of the crusher.

Now referring back to FIG. 5A, by pulling the rods 35 out of the pin hole 36 in the lock arm 22 when the bracket 11 is in the position shown by chain line P1, pivoting the lock arm 22 about the shafts 25, and inserting the rods 35 on the left in FIG. 4 into the pin hole 36, the lock arm 22 can be fixed in the position shown in FIG. 5B. Thus, the line a–a' is pivoted an additional angle of $\alpha_1$ (FIG. 5C) to the position P2 shown in FIG. 5A.

As a whole, the line a–a' can be pivoted, with the arm 4b fixed, by an angle $\alpha_2$ which is the sum of the angle $\alpha_0$ by which the bracket 11 can pivot and the angle $\alpha_1$ by which the lock arm 22 can pivot. Thus, provided the angle by which the bracket 60 of the conventional crusher shown in FIG. 8 can pivot is equal to the angle by which the bracket 11 of the embodiment can pivot, the working range of the crusher of the embodiment is larger than that of the conventional crusher shown in FIG. 8 by an angle $\alpha_1$ i.e. the angle the lock arm 22 can pivot.

Figure 6:
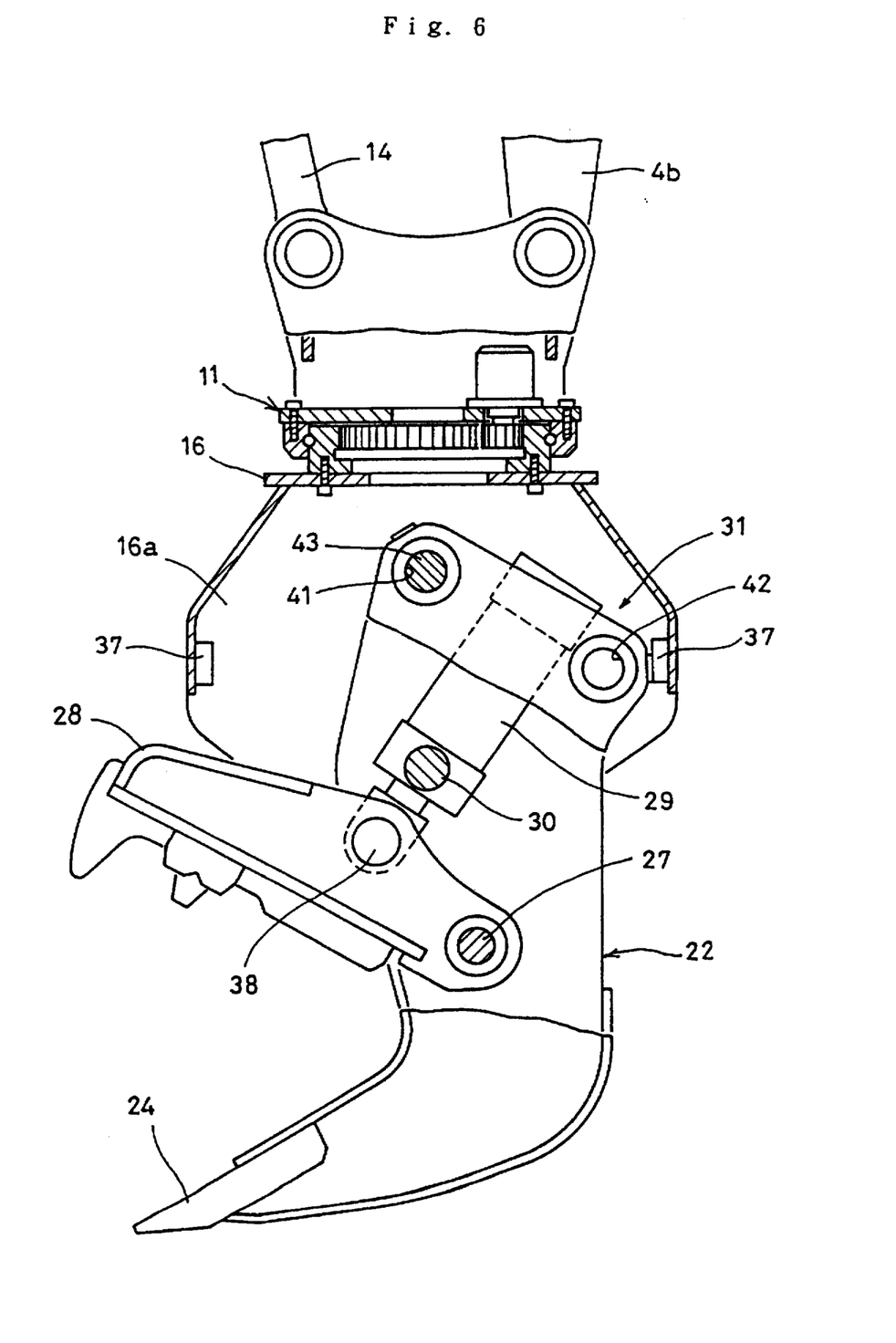
FIG. 6 is a sectional view of a different fixing means.
Figure 7:
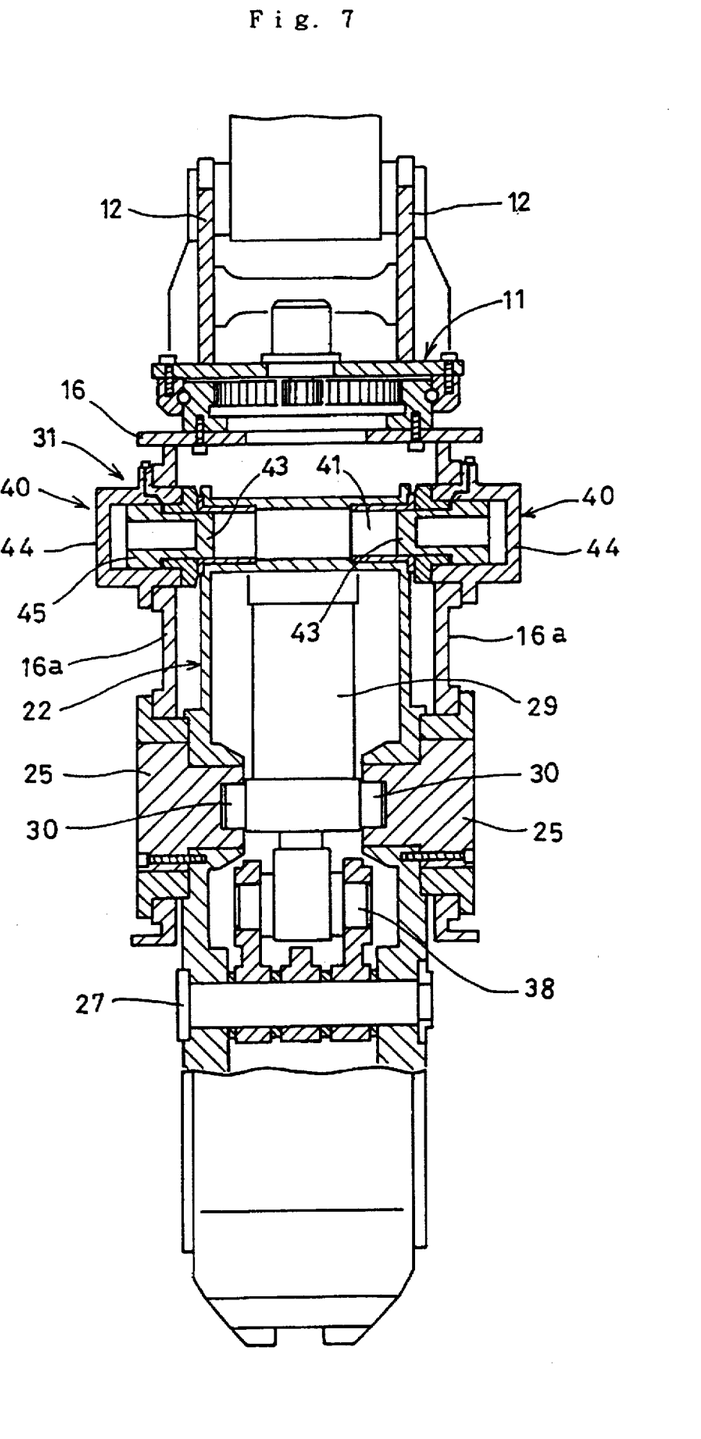
FIG. 7 is a side view in vertical section of FIG. 6.

FIGS. 6 and 7 show another embodiment of the fixing means 31. This fixing means 31 comprises a pair of engaging cylinders 40 mounted on the support plates 16a of the frame 16 opposite to each other, and two pin holes 41 and 42 formed in the rear end of the lock arm 22 and positioned such that when the lock arm 22 is in abutment with one of the stoppers 37 fixed to the frame 16, rods 43 of the engaging cylinders 40 are inserted in the corresponding one of the pin holes 41 and 42.

The engaging cylinders 40 are single-acting cylinders each comprising a cylinder tube 44, and a piston 45 carrying the rod 43 and slidably mounted in the cylinder tube 44. Front and rear chambers are defined in the cylinder tube 44 by the piston 45. The rod 43 is adapted to be pushed into the cylinder tube by the pressure of oil supplied into the front chamber and pushed out by the pressure of gas filling the rear chamber.

The fixing means 31 used in the embodiment is of the type in which the rods 35, 43 of the engaging cylinders 32, 40 are inserted in and pulled out of the pin holes 41, 42 formed in the rear end of the lock arm 22 to fix the arm 22 in a desired position. But it is not limited to this type.

For example, it is possible to use a fixing means comprising engaging pins slidably mounted on the support plates 16a of the frame 16 and adapted to be manually inserted in a pin hole formed in the rear end of the lock arm so as not to be come out of the hole.

What is claimed is:

1. A crusher comprising:

a bracket capable of being pivotally mounted on a free end of an arm of a self propelled machine;

a frame, rotatably mounted on said bracket, including a pair of support plates;

a lock arm pivotally mounted between said pair of support plates of said frame and having a pair of arm plates, said lock arm carrying at a front end thereof a crushing jaw and being pivotable about a first axis between a first position and a second position;

a movable arm pivotally mounted between said arm plates of said lock arm so as to be pivotable about a second axis which is located nearer to said front end of said lock arm than said first axis about which said lock arm pivots;

a trunnion type drive cylinder mounted between said arm plates of said lock arm for pivoting said movable arm relative to said crushing jaw, said trunnion type drive cylinder having a pair of pivot members which are aligned with said first axis; and a fixing means for fixing said lock arm to said frame at said first position and at said second position, wherein said lock arm can be pivoted from said first position, through a predetermined angle, to said second position.

2. The crusher as claimed in claim 1, wherein said fixing means comprises:

a pin hole formed in a rear end of said lock arm;

a first pair of axially aligned engaging cylinders mounted on said pair of support plates of said frame, respectively, and each engaging cylinder of said first pair of engaging cylinders has a rod; and a second pair of axially aligned engaging cylinders mounted on said pair of support plates of said frame, respectively, and each engaging cylinder of said second pair of engaging cylinders has a rod, wherein said first and second pairs of engaging cylinders are disposed along a circular locus having said pin hole as an axis, said first and second pairs of engaging cylinders are separated by an angle which is equal to said predetermined angle, said rods of said first pair of cylinders are capable of engaging in said pin hole when said pin hole comes into alignment said first pair of cylinders, and said rods of said second pair of cylinders are capable of engaging in said pin hole when said pin hole comes into alignment with said second pair of cylinders.

3. The crusher as claimed in claim 2, wherein each engaging cylinder of said first and second pairs of axially aligned engaging cylinders is a single-acting cylinder comprising:

a cylinder tube fixed to one support plate of said pair of support plates;

a piston slidably mounted in said cylinder tube and carrying said rod, said piston defining a front chamber and a rear chamber in said cylinder tube; and a spring disposed in said rear chamber and biasing said piston out of said cylinder tube, wherein said piston can be pushed into said cylinder tube by supplying oil under pressure into said front chamber.

4. The crusher as claimed in claim 2, wherein each engaging cylinder of said first and second pairs of axially aligned engaging cylinders is a single-acting cylinder comprising:

a cylinder tube fixed to one support plate of said pair of support plates; and a piston slidably mounted in said cylinder tube and carrying said rod, said piston defining a front chamber and a rear chamber in said cylinder tube;

wherein said piston can be pushed into said cylinder tube by supplying oil under pressure into said front chamber, and said rear chamber is filled with a pressurized gas to bias said piston out of said cylinder tube.

5. The crusher as claimed in claim 2, wherein each engaging cylinder of said first and second pairs of axially aligned engaging cylinders is a double-acting cylinder comprising:

a cylinder tube fixed to one support plate of said pair of support plates; and a piston slidably mounted in said cylinder tube and carrying said rod, said piston defining a front chamber and a rear chamber in said cylinder tube;

wherein said piston can be pushed into and out of said cylinder tube by selectively supplying oil into said front and rear chambers.

6. The crusher as claimed in claim 1, wherein said fixing means comprises:

a first pin hole formed in a rear end of said lock arm;

a second pin hole formed in a rear end of said lock arm, said first and second pin holes being disposed on a circumference of a circle having its center on said first axis, and said first and second pin holes are separated by an angle which is equal to said predetermined angle; and a pair of axially aligned engaging cylinders mounted on said pair of support plates of said frame, respectively, and each engaging cylinder of said pair of engaging cylinders has a rod, wherein said rods of said pair of engaging cylinders are capable of engaging in one of said first and second pin holes when said one of said first and second pin holes comes into alignment with said rods.

7. The crusher as claimed in claim 6, wherein each engaging cylinder of said pair of axially aligned engaging cylinders is a single-acting cylinder comprising:

a cylinder tube fixed to one support plate of said pair of support plates;

a piston slidably mounted in said cylinder tube and carrying said rod, said piston defining a front chamber and a rear chamber in said cylinder tube; and a spring disposed in said rear chamber and biasing said piston out of said cylinder tube, wherein said piston can be pushed into said cylinder tube by supplying oil under pressure into said front chamber.

8. The crusher as claimed in claim 6, wherein each engaging cylinder of said pair of axially aligned engaging cylinders is a single-acting cylinder comprising:

a cylinder tube fixed to one support plate of said pair of support plates; and a piston slidably mounted in said cylinder tube and carrying said rod, said piston defining a front chamber and a rear chamber in said cylinder tube;

wherein said piston can be pushed into said cylinder tube by supplying oil under pressure into said front chamber, and said rear chamber is filled with a pressurized gas to bias said piston out of said cylinder tube.

9. The crusher as claimed in claim 6, wherein each engaging cylinder of said pair of axially aligned engaging cylinders is a double-acting cylinder comprising:

a cylinder tube fixed to one support plate of said pair of support plates; and a piston slidably mounted in said cylinder tube and carrying said rod, said piston defining a front chamber and a rear chamber in said cylinder tube;

wherein said piston can be pushed into and out of said cylinder tube by selectively supplying oil into said front and rear chambers.

* * * * *